US010981553B2

(12) United States Patent
Kam et al.

(10) Patent No.: US 10,981,553 B2
(45) Date of Patent: Apr. 20, 2021

(54) PRESSURE CONTROL VALVE FOR VEHICLE

(71) Applicant: HYUNDAI MOBIS CO., LTD., Seoul (KR)

(72) Inventors: Moo Chul Kam, Yongin-si (KR); Soung Jun Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 15 days.

(21) Appl. No.: 16/360,301

(22) Filed: Mar. 21, 2019

(65) Prior Publication Data
US 2019/0291706 A1 Sep. 26, 2019

(30) Foreign Application Priority Data

Mar. 21, 2018 (KR) .................. 10-2018-0032570

(51) Int. Cl.
F16K 31/06 (2006.01)
B60T 8/36 (2006.01)
B60T 15/02 (2006.01)
B60T 8/32 (2006.01)
(Continued)

(52) U.S. Cl.
CPC ............ B60T 15/028 (2013.01); B60T 8/176 (2013.01); B60T 8/3255 (2013.01);
(Continued)

(58) Field of Classification Search
CPC ...... B60T 8/363; B60T 8/3675; B60T 15/028; B60T 2220/04; B60T 8/3255;
(Continued)

(56) References Cited

U.S. PATENT DOCUMENTS 6,213,572 B1 * 4/2001 Linkner, Jr. ............ B60T 8/326
303/113.4
2004/0135431 A1 * 7/2004 Sekine ................ B60T 8/17558
303/140
(Continued)

FOREIGN PATENT DOCUMENTS

DE 102004057873 A1 * 6/2005 ......... F16K 31/0665
KR 10-2012-0053216 A 5/2012

Primary Examiner — Bradley T King
Assistant Examiner — Stephen M Bowes
(74) Attorney, Agent, or Firm — Knobbe Martens Olson & Bear LLP

(57) ABSTRACT

A pressure control valve for a vehicle is provided. The pressure control valve for a vehicle includes: a valve body having an oil inlet part into which oil discharged from a wheel cylinder flows; a driving part installed in the valve body; a plunger connected to the driving part and movably installed inside the valve body; a valve seat disposed inside the valve body and having an oil passage part formed such that the oil flowing into the oil inlet part is supplied to an accumulator; a first elastic member installed to apply an elastic force to the plunger such that the plunger returns to an original position; an opening and closing member installed in the oil passage part to open the oil passage part when the opening and closing member is pressed by the plunger; and a second elastic member applying an elastic force to the opening and closing member such that the opening and closing member closes the oil passage part.

11 Claims, 10 Drawing Sheets

(51) Int. Cl.
*B60T 8/176* (2006.01)
*F16K 47/02* (2006.01)
*F16K 17/36* (2006.01)
*B60T 13/68* (2006.01)
*B60L 7/26* (2006.01)

(52) U.S. Cl.
CPC .......... *B60T 13/686* (2013.01); *F16K 17/366* (2013.01); *F16K 47/02* (2013.01); *B60L 7/26* (2013.01); *B60T 2270/10* (2013.01)

(58) Field of Classification Search
CPC ...... B60T 8/326; B60T 8/3275; B60T 8/3295; F16K 31/0662; F16K 31/0665; F16K 31/0658
See application file for complete search history.

(56) References Cited

U.S. PATENT DOCUMENTS

| | | | | |
|---|---|---|---|---|
| 2004/0211472 | A1* | 10/2004 | Weber | F16K 31/0665 137/596.17 |
| 2004/0262557 | A1* | 12/2004 | Carrillo | F16K 31/0665 251/129.14 |
| 2006/0180782 | A1* | 8/2006 | Moreno | F16K 31/0637 251/129.14 |
| 2007/0057574 | A1* | 3/2007 | Mizutani | B60T 8/3275 303/155 |
| 2013/0134767 | A1* | 5/2013 | Hakiai | B60T 7/042 303/3 |
| 2014/0150908 | A1* | 6/2014 | Mayr | G05D 16/2013 137/614.19 |

* cited by examiner

PRESSURE CONTROL VALVE FOR VEHICLE

CROSS-REFERENCES TO RELATED APPLICATIONS

The present application claims priority to Korean application number 10-2018-0032570, filed on Mar. 21, 2018, which is incorporated by reference in its entirety.

BACKGROUND OF THE INVENTION

The present invention relates to a pressure control valve for a vehicle, and more particularly, to a pressure control valve for a vehicle, capable of reducing the number of parts and reducing operating noise.

Generally, mild hybrid is a device that cannot be driven by a motor alone, but can reduce manufacturing cost and improve fuel efficiency. The mild hybrid charges a battery through regenerative braking and uses electricity charged in the battery to drive an air conditioner or an air conditioning system. Therefore, the burden on an engine can be reduced.

A regenerative braking apparatus allows a motor to operate as a generator by using a braking force when a vehicle decelerates (brakes) and charges a battery with electric energy. The regenerative braking apparatus is provided with an electronic braking system, a pedal simulator, a pedal stroke sensor, and a hydraulic control valve. In the regenerative braking apparatus, a braking force of a driver applied to a brake pedal is partially cut off and used for regenerative braking. For example, if the driver's pedal effort of a brake pedal is 50 bar, the hydraulic braking force of 30 bar is transmitted, and the remaining braking force of 20 bar is distributed to the regenerative braking.

In addition, in the hydraulic control valve, an elastic force of a plunger spring pushes a plunger to close a valve seat. Furthermore, when a magnetic force is generated in a stator by an electromagnetic force of a coil part, the flow path of the valve seat is opened as the plunger is attached to the stator.

However, since the regenerative braking device is provided with the electronic braking system, the pedal simulator, the pedal stroke sensor, and the hydraulic control valve, the layout of the hydraulic line and the component parts in the regenerative braking apparatus is complicated. Therefore, the manufacturing cost is increased, and the assemblability is deteriorated because a separate brake line must be connected.

In addition, when the plunger is attached to the stator due to the generation of the magnetic force in the stator, the electromagnetic force is sharply increased as the gap between the plunger and the stator is narrowed. Thus, the impact of the plunger and the stator increases the operating noise.

Therefore, there is a need to improve this problem.

The background art of the present invention is disclosed in Korean Patent Application Publication No. 2012-0053216 (published on May 25, 2012, entitled "Braking Apparatus for Regenerative Braking and High Efficiency Regenerative Braking Method").

SUMMARY OF THE INVENTION

Embodiments of the present invention are directed to a pressure control valve for a vehicle, capable of reducing the number of parts and reducing operating noise.

In one embodiment, a pressure control valve for a vehicle includes: a valve body having an oil inlet part into which oil discharged from a wheel cylinder flows; a driving part installed in the valve body; a plunger connected to the driving part and movably installed inside the valve body; a valve seat disposed inside the valve body and having an oil passage part formed such that the oil flowing into the oil inlet part is supplied to an accumulator; a first elastic member installed to apply an elastic force to the plunger such that the plunger returns to an original position; an opening and closing member installed in the oil passage part to open the oil passage part when the opening and closing member is pressed by the plunger; and a second elastic member applying an elastic force to the opening and closing member such that the opening and closing member closes the oil passage part.

The oil passage part may include: a first oil passage part communicating with the oil inlet part of the valve body; a second oil passage part which communicates with the first oil passage part and in which the second elastic member and the opening and closing member are disposed; and a third oil passage part formed such that oil discharged to the outside of the valve seat through the second oil passage part is supplied to the accumulator.

The first oil passage part may be formed on a side surface of the valve seat, the second oil passage part may be formed at a central portion of the valve seat, and the third oil passage part may be formed to pass through the valve seat on the outside of the second oil passage part.

A stopping protrusion part may be formed at an end of the second oil passage part so as to block movement of the opening and closing member.

The valve seat may further include a stopper that supports the second elastic member and is installed to close one side of the second oil passage part.

A first space part may be formed on the plunger side of the valve seat, a second space part may be formed on an opposite side of the plunger of the valve seat so as to be connected to the accumulator, and the third oil passage part may be formed to communicate the first space part with the second space part.

The valve body may be provided with a support protrusion part that supports the first elastic member.

The opening and closing member may be a spherical opening and closing ball that is movably installed in the second oil passage part.

The driving part may include: a coil part installed to surround the outside of the valve body; a sleeve installed inside the coil part; and an armature which is installed to be movable inside the sleeve by a magnetic force of the coil part and to which the plunger is connected.

When a pedal stroke sensor detects a pedal effort less than a set pressure, the opening and closing member may be pressed by the plunger to open the oil passage part.

When the pedal stroke sensor detects a pedal effort equal to or higher than the set pressure, a pressing force of the plunger may be released such that the opening and closing member closes the oil passage part.

When the pedal stroke sensor detects sudden braking, the driving part may repeat pressing and releasing of the opening and closing member by reciprocating the plunger.

DESCRIPTION OF SPECIFIC EMBODIMENTS

Hereafter, a pressure control valve for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
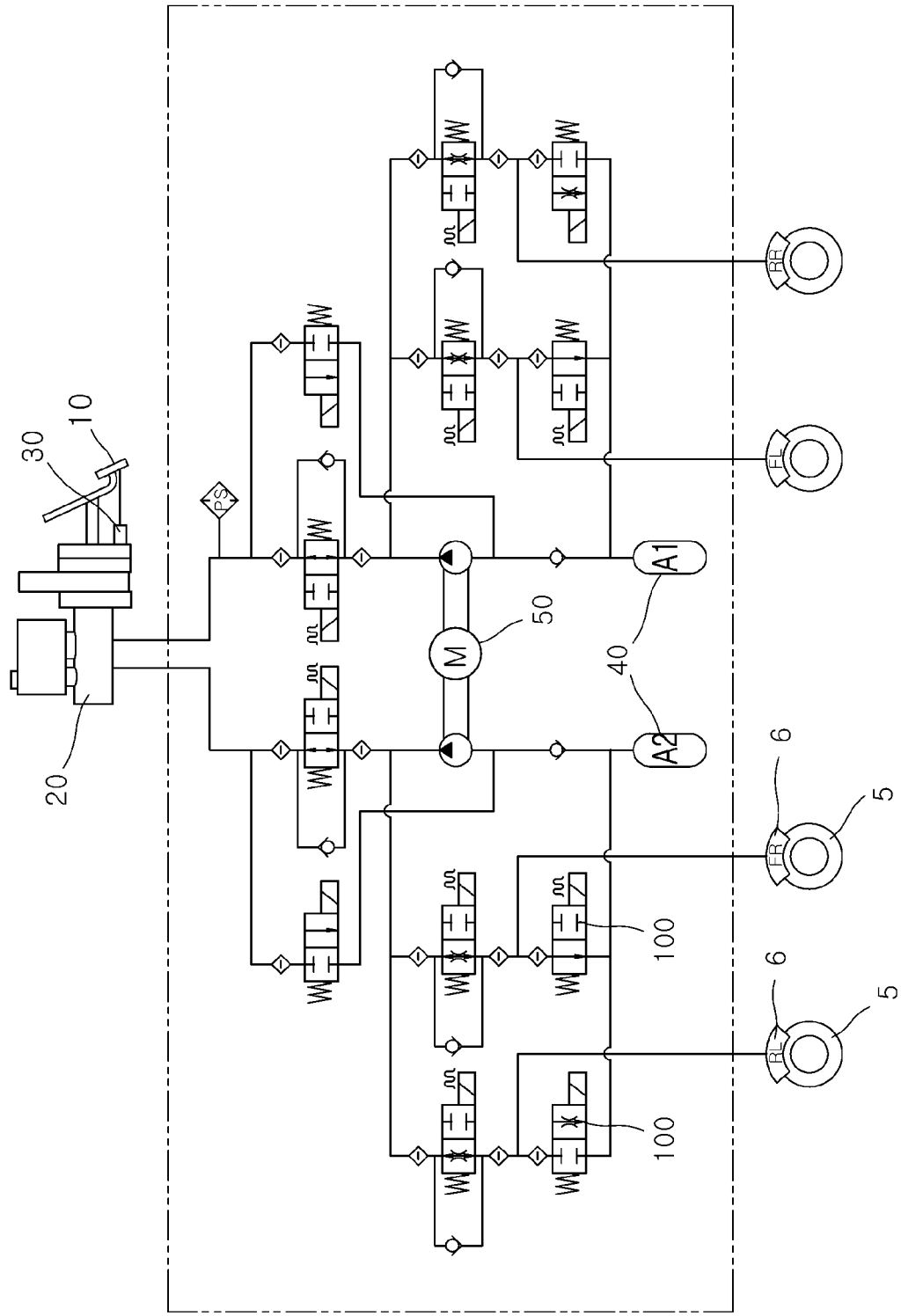
FIG. 1 is a circuit diagram of a regenerative braking apparatus in accordance with an embodiment of the present invention.

FIG. 1 is a circuit diagram of a regenerative braking apparatus in accordance with an embodiment of the present invention.

Referring to FIG. 1, the regenerative braking apparatus includes a brake pedal 10, a master cylinder part 20, a pedal stroke sensor 30, an accumulator 40, a pressure control valve 100 and a pressure control motor 50.

The brake pedal 10 is connected to the master cylinder part 20. The pedal stroke sensor 30 senses the stroke of the brake pedal 10 when the pedal effort is applied to the brake pedal 10, and a control unit (not illustrated) calculates the pedal effort by converting the sensed stroke.

The accumulator 40 is connected to the pressure control valve 100, the pressure control motor 50, and the master cylinder part 20 by a hydraulic line. A brake part 6 is installed for each wheel 5, and a wheel cylinder 60 (see FIG. 2) is installed in the brake part 6. The pressure control valve 100 is connected to the wheel cylinder 60 by the hydraulic line. The pressure control valve 100 includes a front pressure control valve 100 connected to the hydraulic line of the front wheel 5 and a rear pressure control valve 100 connected to the hydraulic line of the rear wheel 5.

Oil discharged from the wheel cylinder 60 flows into the pressure control valve 100, and oil discharged from the pressure control valve 100 is supplied to the accumulator 40. When the oil remains in the accumulator 40, the pressure control motor 50 is driven to discharge the oil from the accumulator 40.

Figure 2:
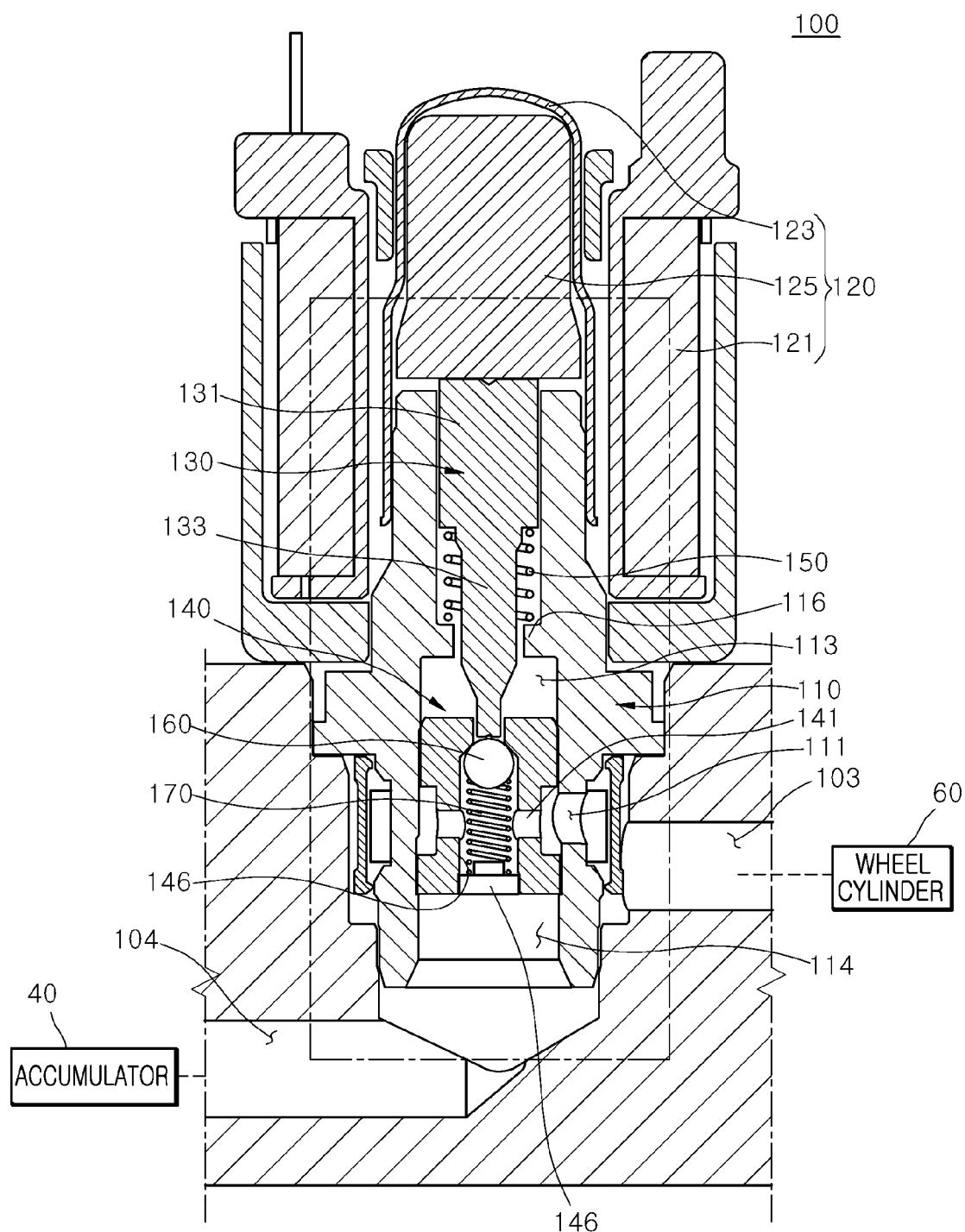
FIG. 2 is a cross-sectional view of a pressure control valve for a vehicle in accordance with an embodiment of the present invention.
Figure 3:
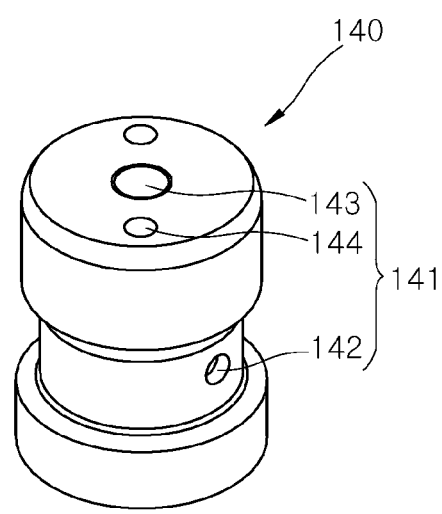
FIG. 3 is an enlarged view illustrating a valve seat, opening and closing member and a second elastic member of the pressure control valve for the vehicle in accordance with an embodiment of the present invention.
Figure 3:
Figure 3:
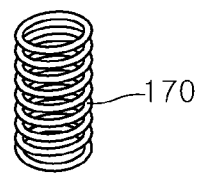
Figure 3:
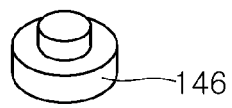
Figure 4:
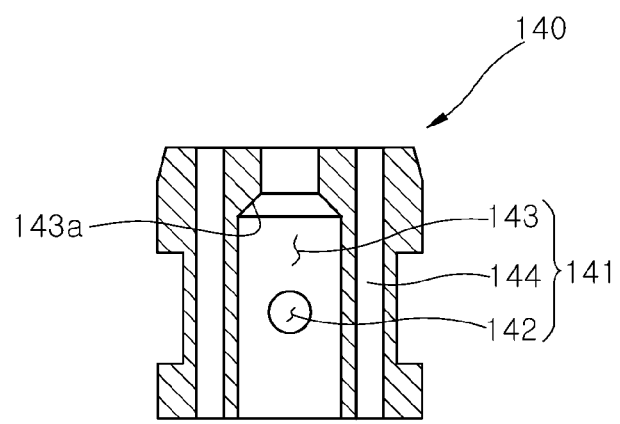
FIG. 4 is a cross-sectional view illustrating a valve seat of the pressure control valve for the vehicle in accordance with an embodiment of the present invention.
Figure 5:
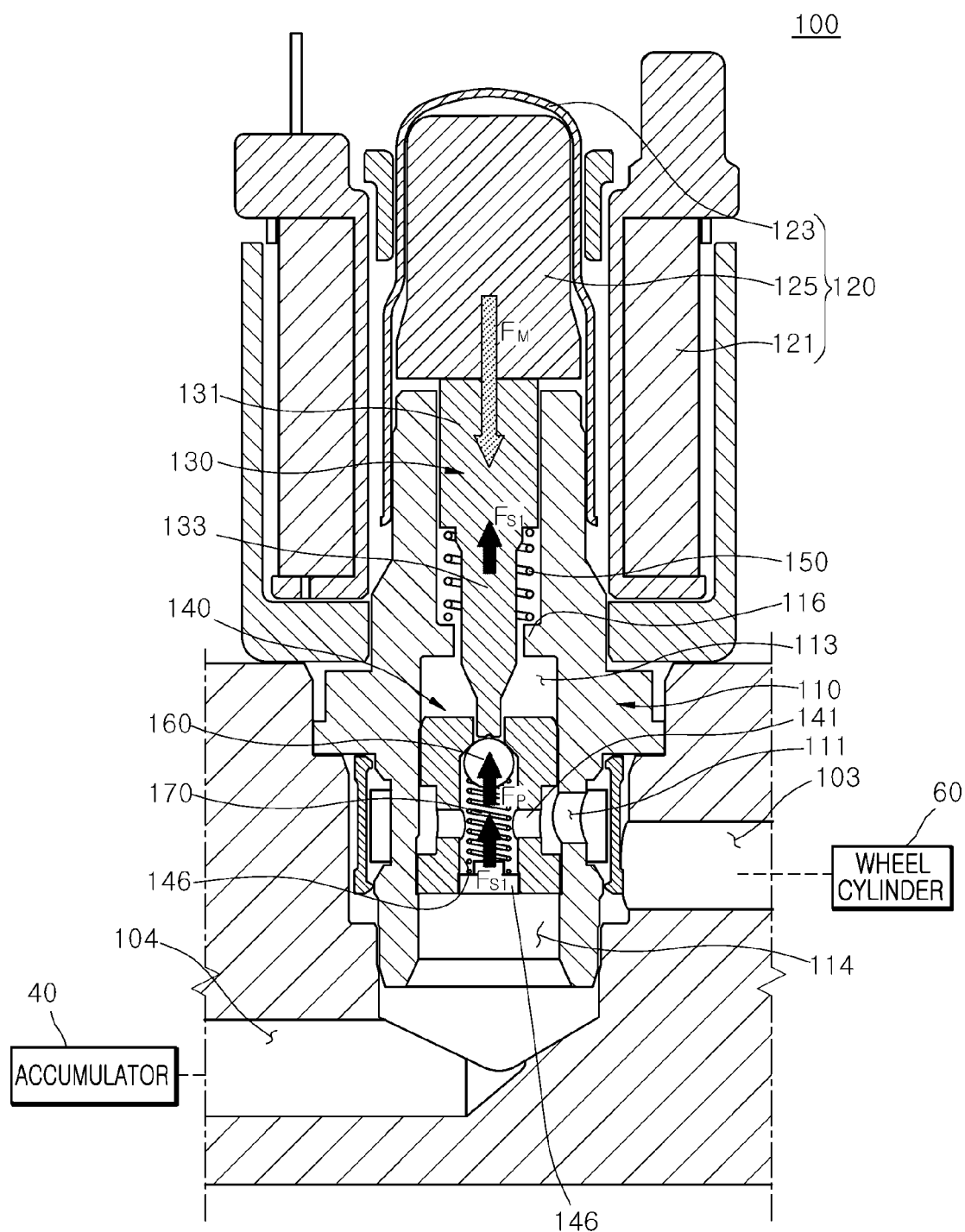
FIG. 5 is an operational state diagram illustrating a force applied to the pressure control valve for the vehicle in accordance with an embodiment of the present invention.

FIG. 2 is a cross-sectional view of the pressure control valve for the vehicle in accordance with an embodiment of the present invention, FIG. 3 is an enlarged view illustrating a valve seat, opening and closing member and a second elastic member of the pressure control valve for the vehicle in accordance with an embodiment of the present invention, FIG. 4 is a cross-sectional view illustrating a valve seat of the pressure control valve for the vehicle in accordance with an embodiment of the present invention, and FIG. 5 is an operational state diagram illustrating a force applied to the pressure control valve for the vehicle in accordance with an embodiment of the present invention.

Referring to FIGS. 2 to 5, the pressure control valve 100 for the vehicle in accordance with an embodiment of the present invention includes a valve body 110, a driving part 120, a plunger 130, a valve seat 140, a first elastic member 150, an opening and closing member 160, and a second elastic member 170.

An oil inlet part 111 is formed in the valve body 110 such that the oil discharged from the wheel cylinder 60 flow thereinto. The valve body 110 is connected to a support 101. The support 101 includes an inlet passage 103 connected to the wheel cylinder 60 and an outlet passage 104 connected to the accumulator 40. The wheel cylinder 60 is installed in the wheel 5. The valve body 110 is disposed between the inlet passage 103 and the outlet passage 104 so as to prevent the inlet passage 103 and the outlet passage 104 from communicating with each other. A hollow part (not illustrated) is formed inside the valve body 110. The valve body 110 may be formed in a pipe shape as a whole.

A support protrusion part 116 is formed in the valve body 110 so as to support the first elastic member 150. The upper side of the first elastic member 150 is supported by a slider part 131 of the plunger 130, and the lower side of the first elastic member 150 is supported by the support protrusion part 116. Therefore, as the plunger 130 is moved, the first elastic member 150 can be expanded or contracted in a longitudinal direction.

The driving part 120 is installed in the valve body 110. The driving part 120 is disposed so as to surround the outer side of the valve body 110. The driving part 120 includes a coil part 121, a sleeve 123, and an armature 125.

The coil part 121 is installed so as to surround the outer side of the valve body 110. The coil part 121 may be formed in a cylindrical shape. The sleeve 123 is installed inside the coil part 121. The sleeve 123 is formed in a cylindrical shape whose upper side is closed. The outer surface of the sleeve 123 is provided to be in contact with the inner surface of the coil part 121. The sleeve 123 is connected to the upper side of the valve body 110 to close the end of the valve body 110. The armature 125 is installed so as to be movable inside the sleeve 123 by the magnetic force of the coil part 121, and the plunger 130 is connected to the armature 125. The plunger 130 is moved together with the armature 125.

The plunger 130 is connected to the driving part 120 and is movably installed inside the valve body 110. The plunger 130 includes a slider part 131 slidably installed in the inner side of the valve body 110, and a pressing rod part 133 extending from the slider part 131 toward the valve seat 140 side (lower side) and having an outer diameter smaller than that of the slider part 131. The slider part 131 is in contact with the inner surface of the valve body 110, and the pressing rod part 133 is separated from the inner surface of the valve body 110. Since the slider part 131 of the plunger 130 slides on the inner surface of the valve body 110, it is possible to prevent the plunger 130 from shaking when the plunger 130 moves.

The valve seat 140 is disposed inside the valve body 110, and an oil passage part 141 is formed such that the oil flowing into the oil inlet part 111 is supplied to the accumulator 40. The valve seat 140 is formed in a cylindrical shape of which both sides are opened. The oil discharged from the wheel cylinder 60 is supplied to the accumulator 40 through the oil inlet part 111.

The oil passage part 141 includes a first oil passage part 142, a second oil passage part 143, and a third oil passage part 144. The first oil passage part 142 communicates with the oil inlet part 111 of the valve body 110. The second oil passage part 143 communicates with the first oil passage part 142, and the second elastic member 170 and the opening and closing member 160 are disposed in the second oil passage part 143. The diameter of the second oil passage part 143 is formed to be larger than the diameter of the first oil passage part 142. The third oil passage part 144 is formed such that the oil discharged to the outside of the valve seat 140 through the second oil passage part 143 is supplied to the accumulator 40. The oil flowing into the oil inlet part 111 is supplied to the accumulator 40 after sequentially passing through the first oil passage part 142, the second oil passage part 143, and the third oil passage part 144.

The first oil passage part 142 is formed on the side surface of the valve seat 140, the second oil passage part 143 is formed at the central portion of the valve seat 140, and the third oil passage part 144 is formed to pass through the valve seat 140 on the outer side of the second oil passage part 143. At this time, the first oil passage part 142 is formed perpendicular to the longitudinal direction of the valve seat 140, and the second oil passage part 143 and the third oil passage part 144 are formed parallel to the longitudinal direction of the valve seat 140. A plurality of first oil passage parts 142 may be formed on the side surface of the valve seat 140, one second oil passage part 143 may be formed at the central portion of the valve seat 140, and a plurality of third oil passage parts 144 may be formed along the longitudinal direction of the valve seat 140.

At the end of the second oil passage part 143, a stopping protrusion part 143a is formed so as to block the movement of the opening and closing member 160. The stopping protrusion part 143a is disposed above the opening and closing member 160. An inclined surface part (not illustrated) is formed below the stopping protrusion part 143a. Since the opening and closing member 160 is installed so as to be caught by the stopping protrusion part 143a, the opening and closing member 160 does not come off from the second oil passage part 143 even if the second elastic member 170 pushes the opening and closing member 160 toward the plunger 130.

The valve seat 140 further includes a stopper 146 installed so as to support the second elastic member 170 and close one side of the second oil passage part 143 (end opposite to the plunger 130). The stopper 146 and the opening and closing member 160 are disposed on both sides of the second elastic member 170. Since the stopper 146 supports the second elastic member 170, the second elastic member 170 is contracted in the longitudinal direction when the opening and closing member 160 is pressed.

A first space part 113 is formed on the plunger 130 side of the valve seat 140, a second space part 114 is formed on the opposite side of the plunger 130 of the valve seat 140 so as to be connected to the accumulator 40, and the third oil passage part 144 is formed so as to communicate the first space part 113 with the second space part 114. The diameter of the first space part 113 is formed several times larger than the diameter of the second oil passage part 143, and the diameter of the second space part 114 is formed several times larger than the diameter of the third oil passage part 144.

Therefore, as the oil of the second oil passage part 143 flows into the first space part 113, the pressure difference of the oil is reduced, and the oil of the third oil passage part 144 flows into the second space part 114, thereby alleviating the pressure difference of the oil. Therefore, the first space part 113 and the second space part 114 can function as a buffer space for oil.

The first elastic member 150 is installed to apply an elastic force to the plunger 130 such that the plunger 130 returns to an original position. The first elastic member 150 may be a first coil spring into which the pressing rod part 133 of the plunger 130 is inserted. The first elastic member 150 applies an elastic force to the plunger 130 to push the plunger 130 toward the opposite side of the valve seat 140.

The opening and closing member 160 is installed in the oil passage part 141 so as to open the oil passage part 141 as the opening and closing member 160 is pressed by the plunger 130. When the opening and closing member 160 opens the oil passage part 141, the oil discharged from the wheel cylinder 60 is supplied to the accumulator 40 through the oil inlet part 111.

The opening and closing member 160 may be a spherical opening and closing ball that is movably installed in the second oil passage part 143. Since the opening and closing ball is spherical, the flow resistance of the oil can be reduced when the oil is discharged from the second oil passage part 143.

The second elastic member 170 applies an elastic force to the opening and closing member 160 such that the opening and closing member 160 closes the oil passage part 141. The second elastic member 170 may be a second coil spring that supports the opening and closing member 160. When the plunger 130 presses the opening and closing member 160, the second elastic member 170 is contracted in the longitudinal direction to allow the opening and closing member 160 to open the oil passage part 141. When the plunger 130 releases the pressure of the opening and closing member 160, the second elastic member 170 extends in the longitudinal direction such that the opening and closing member 160 closes the oil passage part 141.

When the pedal stroke sensor 30 detects a pedal effort less than a set pressure, the opening and closing member 160 is pressed by the plunger 130 so as to open the oil passage part 141. Here, the set pressure may be set to about 13 bar to about 17 bar.

At this time, when power is supplied to the coil part 121, the armature 125 is moved toward the valve seat 140 by the magnetic force of the coil part 121. The second oil passage part 143 is opened as the plunger 130 moves together with the armature 125 to press the opening and closing member 160. When the second oil passage part 143 is opened, the oil of the wheel cylinder 60 is supplied to accumulator 40 through the oil inlet part 111, the first oil passage part 142, the second oil passage part 143, the first space part 113, the third oil passage part 144, and the second space part 114. Since the oil of the wheel cylinder 60 is supplied to the accumulator 40, the pressure of the accumulator 40 is increased.

Therefore, since the hydraulic pressure of the accumulator 40 increases the reaction force against the pedal effort of the brake pedal 10, the accumulator 40 may function as an existing pedal simulator. Therefore, the installation of the pedal simulator may be omitted, and the layout of the hydraulic line and the component parts in the regenerative braking apparatus may be simply configured.

In addition, when the pedal stroke sensor 30 detects the pedal effort less than the set pressure, the wheel 5 may be braked only by a regenerative braking force of a regenerative motor installed in the wheel 5. Therefore, the wheel 5 is decelerated by the regenerative braking force of the regenerative motor, and the regenerative motor generates power such that the battery may be charged.

Next, when the pedal stroke sensor 30 detects the pedal effort equal to or higher than the set pressure, the pressing force of the plunger 130 is released such that the opening and closing member 160 closes the oil passage part 141.

At this time, when the power of the coil part 121 is cut off, the armature 125 and the plunger 130 return to their original positions by the restoring forces of the first elastic member 150 and the second elastic member 170. In addition, the second oil passage part 143 is closed as the opening and closing member 160 returns to the original position by the restoring force of the second elastic member 170. Therefore, the oil of the wheel cylinder 60 is not supplied to the accumulator 40.

In addition, when the pedal stroke sensor 30 detects the pedal effort equal to or higher than the set pressure, the wheel 5 may not be sufficiently braked only by the regenerative braking force of the regenerative motor installed in the wheel 5. Therefore, the regenerative braking of the regenerative motor is stopped, and the pressure control motor 50 is driven to transmit the pressure of the accumulator 40 to each of the wheels 5 so as to generate the hydraulic braking force.

Next, when the pedal stroke sensor 30 senses sudden braking, the driving part 120 allow the plunger 130 to reciprocate, thereby repeatedly pressing and releasing the opening and closing member 160. At this time, since the armature 125 and the plunger 130 reciprocate by repeating on/off of the coil part 121, the opening and closing member 160 repeatedly opens and closes the second oil passage part 143. Therefore, when a high pressure situation in which the wheel locking is sensed at the time of sudden braking (ABS braking) of the vehicle occurs, the oil of the wheel cylinder 60 is discharged to the accumulator 40 through the oil passage part 141 even if the oil pressure of the wheel cylinder 60 is significantly increased, thereby quickly depressurizing the wheel pressure.

The operation of the pressure control valve for the vehicle in accordance with an embodiment of the present invention will be described.

Figure 6:
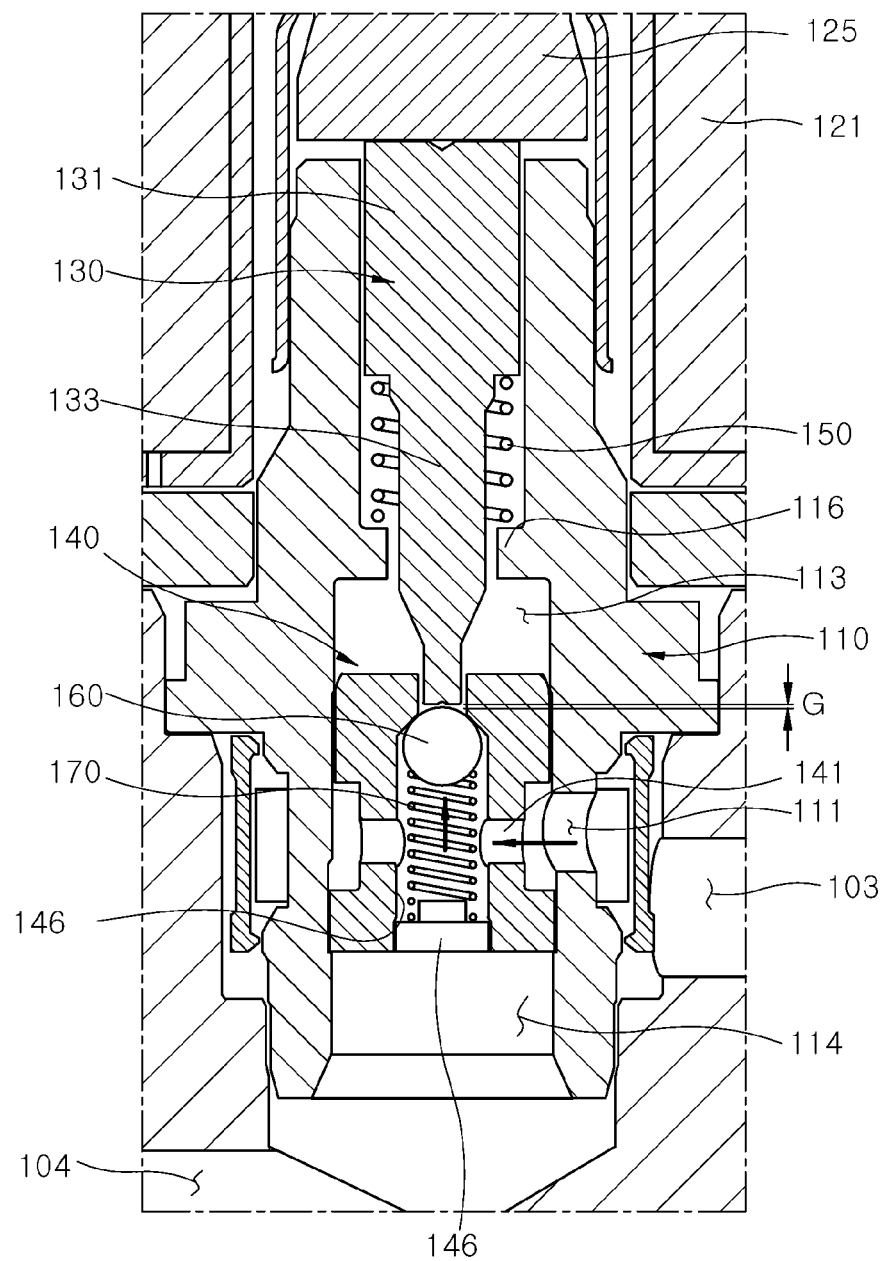
FIG. 6 is a cross-sectional view illustrating a state in which a plunger is separated from an opening and closing member when power is not applied to a coil part in the pressure control valve for the vehicle in accordance with an embodiment of the present invention.
Figure 7:
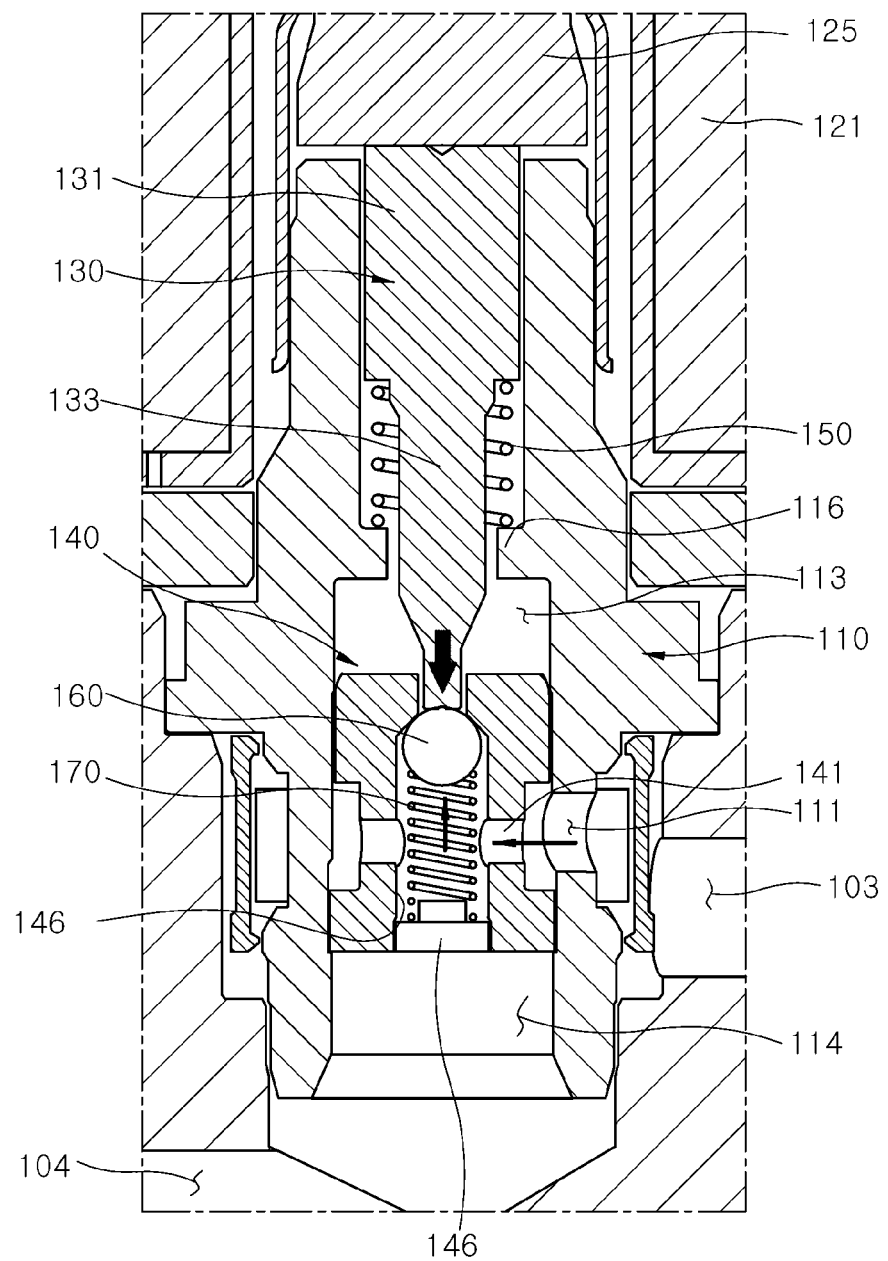
FIG. 7 is a cross-sectional view illustrating a state in which a plunger is moved to an invalid stroke and comes in contact with an opening and closing member when power is applied to a coil part in the pressure control valve for the vehicle in accordance with an embodiment of the present invention.
Figure 8:
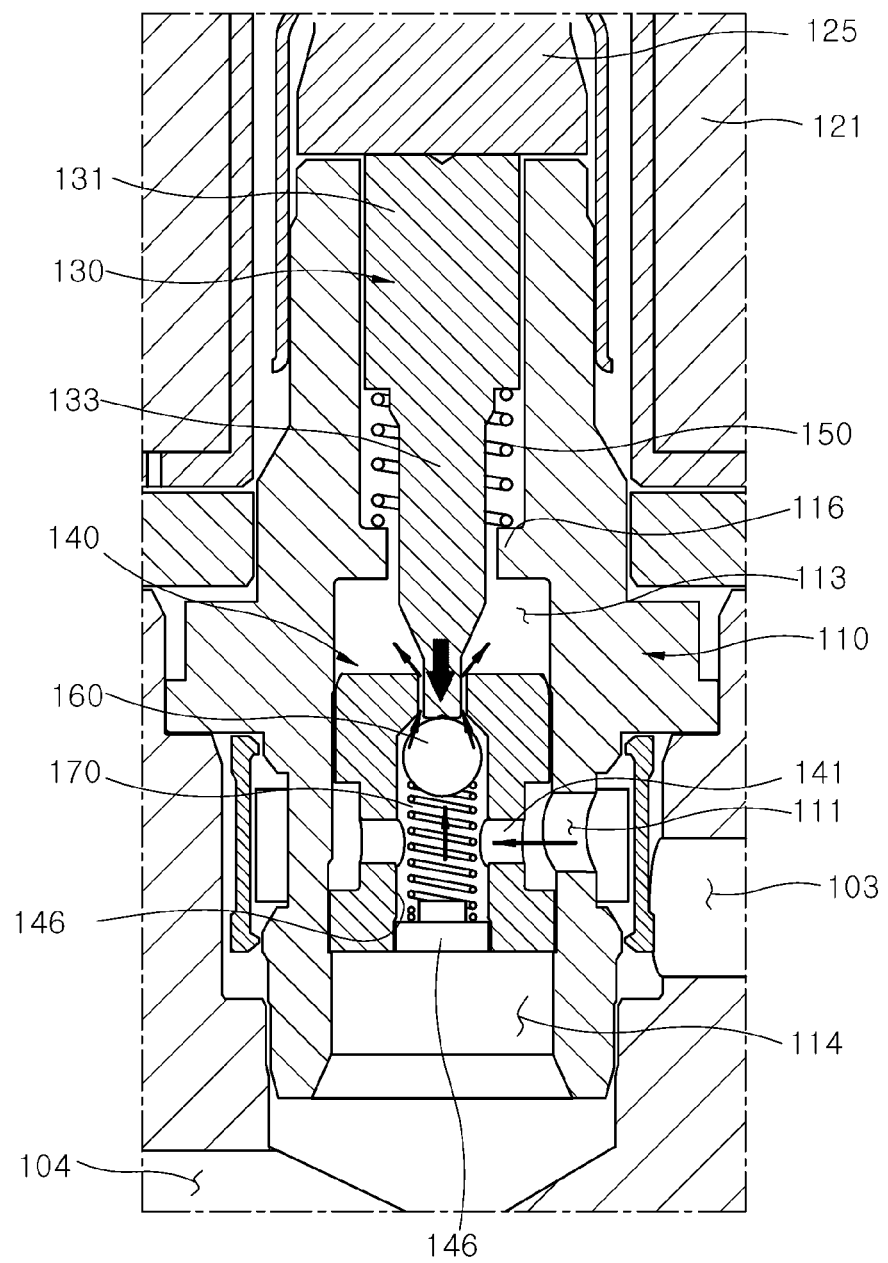
FIG. 8 is a cross-sectional view illustrating a state in which a plunger is moved to a valid stroke and presses an opening and closing member when power is applied to a coil part in the pressure control valve for the vehicle in accordance with an embodiment of the present invention.
Figure 9:
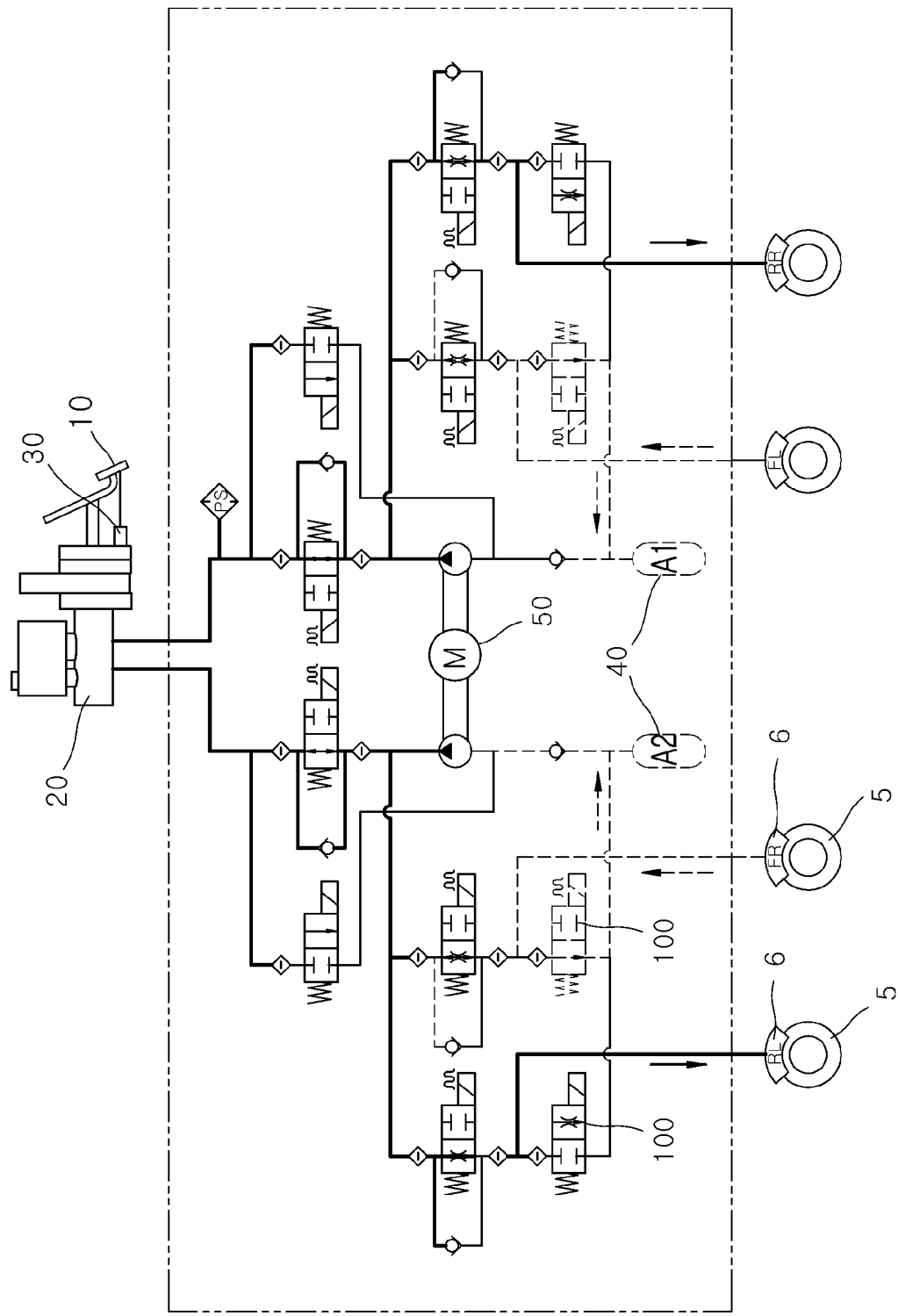
FIG. 9 is a circuit diagram illustrating a state in which oil of a wheel cylinder flows into an accumulator when an opening and closing member is opened in the pressure control valve for the vehicle in accordance with an embodiment of the present invention.
Figure 10:
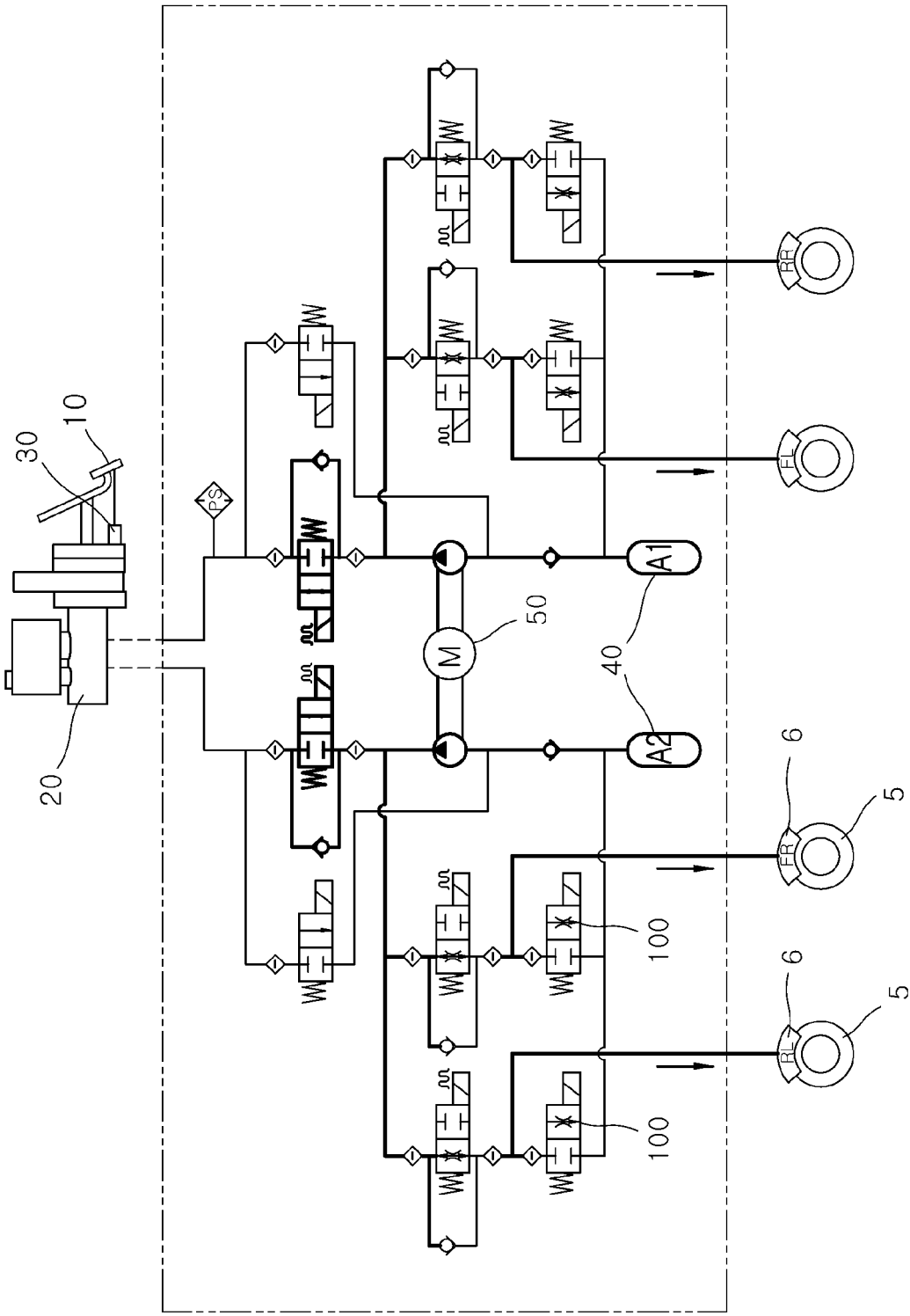
FIG. 10 is a circuit diagram illustrating a state in which an opening and closing member is closed and oil flows into a wheel cylinder to brake a wheel in the pressure control valve for the vehicle in accordance with an embodiment of the present invention.

FIG. 5 is an operational state diagram illustrating a force applied to the pressure control valve for the vehicle in accordance with an embodiment of the present invention, FIG. 6 is a cross-sectional view illustrating a state in which a plunger is separated from an opening and closing member when power is not applied to a coil part in the pressure control valve for the vehicle in accordance with an embodiment of the present invention, FIG. 7 is a cross-sectional view illustrating a state in which a plunger is moved to an invalid stroke and comes in contact with an opening and closing member when power is applied to a coil part in the pressure control valve for the vehicle in accordance with an embodiment of the present invention, FIG. 8 is a cross-sectional view illustrating a state in which a plunger is moved to a valid stroke and presses an opening and closing member when power is applied to a coil part in the pressure control valve for the vehicle in accordance with an embodiment of the present invention, FIG. 9 is a circuit diagram illustrating a state in which oil of a wheel cylinder flows into an accumulator when an opening and closing member is opened in the pressure control valve for the vehicle in accordance with an embodiment of the present invention, and FIG. 10 is a circuit diagram illustrating a state in which an opening and closing member is closed and oil flows into a wheel cylinder to brake a wheel in the pressure control valve for the vehicle in accordance with an embodiment of the present invention.

When the pedal effort is not applied to the brake pedal 10, the power is not supplied to the coil part 121. Therefore, since the armature 125 and the plunger 130 are stopped at the original position, the oil of the wheel cylinder 60 is not supplied to the accumulator 40. At this time, the end of the plunger and the opening and closing member are spaced apart from each other by an interval G of about 0.01 mm (see FIG. 6).

Next, the pedal stroke sensor 30 senses the pedal effort applied to the brake pedal 10.

When the pedal stroke sensor 30 detects the pedal effort less than the set pressure, the power is supplied to the coil part 121. When the magnetic force $F_M$ of the coil is larger than the first elastic force $F_{S1}$ of the first elastic member 150 and is smaller than the total force $(F_{S2}+F_P)$ of the second elastic force $F_{S2}$ of the second elastic member 170 and the pressure $F_P$ of oil ($F_{S1}<F_M<(F_{S2}+F_P)$), the plunger 130 is lowered until contacting the opening and closing member 160 (see FIG. 7: lowered by about 0.1 mm). At this time, since the opening and closing member 160 does not open the second oil passage part 143, the stroke of the plunger 130 is referred to as an invalid stroke.

When the magnetic force $F_M$ of the coil is larger than a total force of the first elastic force $F_{S1}$ of the first elastic member 150, the second elastic force $F_{S2}$ of the second elastic member 170, and the pressure $F_P$ of oil ($F_M>(F_{S1}+F_{S2}+F_P)$), the plunger 130 presses the opening and closing member 160 to open the second oil passage part 143 (see FIG. 8). The stroke of the plunger 130 is referred to as a valid stroke.

At this time, since the plunger 130 first contacts the opening and closing member 160 by the invalid stroke and then opens the opening and closing member 160 by the valid stroke, the second elastic force $F_{S2}$ of the second elastic member 170 prevents the armature 125 from being impacted on the valve body 110 when the armature 125 is lowered. The second elastic member 170 functions as a buffer that absorbs or mitigates the impact force of the armature 125 and the valve body 110. Therefore, it is possible to prevent the operating noise from being generated due to the collision between the armature 125 and the valve body 110 when the pressure control valve 100 for the vehicle is driven, and it is possible to prevent the armature 125 and the valve body 110 from being damaged.

When the second oil passage part 143 is opened, the oil of the wheel cylinder 60 is supplied to accumulator 40 through the oil inlet part 111, the first oil passage part 142, the second oil passage part 143, the first space part 113, the third oil passage part 144, and the second space part 114 (see the dashed-line portion of FIG. 9). Since the oil of the wheel cylinder 60 is supplied to the accumulator 40, the pressure of the accumulator 40 is increased.

In addition, when the pedal stroke sensor 30 detects the pedal effort less than the set pressure, the wheel 5 may be sufficiently braked only by the regenerative braking force of the regenerative motor installed in the wheel 5. Therefore, the front wheel 5 is decelerated by the regenerative braking force of the regenerative motor, and the regenerative motor generates power such that the battery may be charged. In addition, the rear wheels 5 may be braked as the oil 5 is supplied.

When the pedal stroke sensor 30 detects the pedal effort equal to or higher than the set pressure, the power supplied to the coil part 121 is cut off. At this time, the plunger 130 and the armature 125 return to their original positions by the first elastic force $F_{S1}$ of the first elastic member 150, and the opening and closing member 160 returns to the original position by the second elastic force $F_{S2}$ of the second elastic member 170 and the pressure $F_P$ of oil to close the second oil passage part 143.

In addition, the regenerative braking of the regenerative motor is released and the pressure control motor 50 is driven to supply the oil of the accumulator 40 to the wheel 5 so as to brake the wheel 5 with the hydraulic braking force (see FIG. 10).

Next, when the pedal stroke sensor 30 senses sudden braking (ABS braking), the driving part 120 allow the plunger 130 to reciprocate, thereby repeatedly pressing and releasing the opening and closing member 160. At this time, since the armature 125 and the plunger 130 reciprocate by repeating on/off of the coil part 121, the opening and closing member 160 repeatedly opens and closes the second oil passage part 143. In addition, since the pressure $F_P$ of oil is significantly increased, full duty is applied to the coil part 121.

Therefore, even when a high pressure situation occurs during sudden braking of the vehicle and oil pressure of the wheel cylinder 60 is significantly increased, the oil of the wheel cylinder 60 is discharged to the accumulator 40 through the oil passage part 141, thereby quickly depressurizing the wheel pressure.

As described above, since the oil of the wheel cylinder 60 is supplied to the accumulator 40 through the oil passage part 141 when the opening and closing member 160 is opened, the pressure of the accumulator 40 is increased. Therefore, since the hydraulic pressure of the accumulator 40 increases the reaction force against the pedal effort of the brake pedal 10, the accumulator 40 may function as an existing pedal simulator. Therefore, the installation of the pedal simulator may be omitted, and the layout of the hydraulic line and the component parts in the regenerative braking apparatus may be simply configured.

In addition, since the plunger 130 first contacts the opening and closing member 160 by the invalid stroke and then opens the opening and closing member 160 by the valid stroke, the second elastic force $F_{S2}$ of the second elastic member 170 prevents the armature 125 from being impacted on the valve body 110 when the armature 125 is lowered. Therefore, it is possible to prevent the operating noise from being generated when the pressure control valve 100 for the vehicle is driven, and it is possible to prevent the armature 125 and the valve body 110 from being damaged.

In accordance with the present invention, since the oil of the wheel cylinder is supplied to the accumulator through the oil passage part when the opening and closing member is opened, the pressure of the accumulator is increased. Therefore, since the hydraulic pressure of the accumulator increases the reaction force against the pedal effort of the brake pedal, the accumulator may function as the pedal simulator. Therefore, the installation of the pedal simulator may be omitted, and the layout of the hydraulic line and the component parts in the regenerative braking apparatus may be simply configured.

In addition, in accordance with the present invention, since the plunger first contacts the opening and closing member by the invalid stroke and then opens the opening and closing member by the valid stroke, the second elastic force of the second elastic member prevents the armature from being impacted on the valve body when the armature is lowered. Therefore, it is possible to prevent the operating noise from being generated when the pressure control valve for the vehicle is driven, and it is possible to prevent the armature and the valve body from being damaged.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:
1. A pressure control valve for a vehicle, comprising:
   a valve body having an oil inlet into which oil discharged from a wheel cylinder flows;
   a plunger movably installed inside the valve body and configured to move along an axis;
   a valve seat member disposed inside the valve body and having an oil passage and a valve hole connected to the oil passage such that the oil flowing from the oil inlet is supplied to an accumulator through the oil passage and the valve hole;
   a first elastic member installed to apply an elastic force to the plunger such that the plunger returns to an original position;
   an opening and closing member installed in the oil passage to open the valve hole when the opening and closing member is pressed by the plunger; and
   a second elastic member applying an elastic force to the opening and closing member such that the opening and closing member closes the oil passage,
   wherein the valve body comprises a first oil chamber connected to the valve hole and a second oil chamber connected to the accumulator, wherein the valve seat member is disposed between the first oil chamber and the second oil chamber,
   wherein the valve seat member comprises an oil through hole interconnecting the first oil chamber and the second oil chamber for allowing the oil in the first oil chamber to flow to the second oil chamber and the accumulator.
2. The pressure control valve of claim 1, wherein the valve seat member further comprises an oil passage inlet part formed on a side surface of the valve seat member and connected to the oil passage.
3. The pressure control valve of claim 1, wherein the valve seat member comprises a stopping valve seat portion formed at an end of the oil passage so as to block movement of the opening and closing member.

4. The pressure control valve of claim 1, wherein the valve seat member further comprises a stopper that supports the second elastic member and is installed to close one side of the oil passage.

5. The pressure control valve of claim 1, wherein the first oil chamber is formed on a plunger side with respect to the valve seat member, wherein the second oil chamber is formed on an opposite side of the plunger of the valve seat member so as to be connected to the accumulator.

6. The pressure control valve of claim 1, wherein the valve body is provided with a support protrusion part that supports the first elastic member.

7. The pressure control valve of claim 1, wherein the opening and closing member is a spherical ball that is movably installed in the oil passage.

8. The pressure control valve of claim 1, further comprising a driving part for driving the plunger, wherein the driving part comprises:

a coil part installed to surround the valve body;
   a sleeve installed inside the coil part; and
   an armature which is installed to be movable inside the sleeve by a magnetic force of the coil part and to which the plunger is connected.

9. The pressure control valve of claim 1, wherein, when a pedal stroke sensor detects a pedal effort less than a set pressure, the opening and closing member is pressed by the plunger to open the oil passage.

10. The pressure control valve of claim 9, wherein, when the pedal stroke sensor detects a pedal effort equal to or higher than the set pressure, a pressing force of the plunger is released such that the opening and closing member closes the oil passage.

11. The pressure control valve of claim 9, wherein, when the pedal stroke sensor detects sudden braking, a driving part repeats pressing and releasing of the opening and closing member by reciprocating the plunger.

* * * * *